United States Patent

Ahvenainen

[11] Patent Number: 5,852,781
[45] Date of Patent: Dec. 22, 1998

[54] ESTABLISHING A GROUP CALL IN A MOBILE RADIO SYSTEM

[75] Inventor: Jouko Ahvenainen, Helsinki, Finland

[73] Assignee: Nokia Telecommunications OY, Espoo, Finland

[21] Appl. No.: 676,176
[22] PCT Filed: Nov. 10, 1995
[86] PCT No.: PCT/FI95/00614
§ 371 Date: Jul. 10, 1996
§ 102(e) Date: Jul. 10, 1996
[87] PCT Pub. No.: WO96/15639
PCT Pub. Date: May 23, 1996

[30] Foreign Application Priority Data

Nov. 11, 1994 [FI] Finland ..................................... 945330

[51] Int. Cl.[6] .................................................. H04B 7/155
[52] U.S. Cl. ........................... 455/509; 455/514; 455/519
[58] Field of Search ...................................... 455/507, 509, 455/510, 512, 514, 517, 518, 519, 520, 521, 426

[56] References Cited

U.S. PATENT DOCUMENTS

| 4,775,999 | 10/1988 | Williams | 455/510 |
| 4,833,701 | 5/1989 | Comroe et al. | 455/518 |
| 4,972,460 | 11/1990 | Sasuta | 455/519 |
| 5,200,954 | 4/1993 | Teel, Jr. et al. | |
| 5,327,573 | 7/1994 | Lenchik et al. | |
| 5,625,887 | 4/1997 | Cassidy et al. | 455/509 |

FOREIGN PATENT DOCUMENTS

| 644 702 | 3/1995 | European Pat. Off. | |
| 93/00775 | 1/1993 | WIPO. | |
| 94/14289 | 6/1994 | WIPO. | |
| WO/13686 | 5/1995 | WIPO. | |

OTHER PUBLICATIONS

Sfez et al: Influence of Message Coding Schemes on the Design of a Call Set–Up Protocol:, Proceedings IEEE First Symposium on Communications and Vehicular Technology in the Benelux, 27–29, Oct. 1993, (abstract).
Kruger:, "Bumdelfunknetz Chekker", Nachrichten Technik Elektronik, vol. 41, No. 4, Jul. 1991, pp. 130–134, XP 000240831, see paragraph 2–paragraph 2.1.B; figures.
MPT 1343, Performance Specification: System Interface Specification for radio units to be used with commercial trunked networks operating in Band III sub–bands 1 and 2, Jan. 1988, revised Sep. 1991.
MPT 1327, A Technical Overview of the United Kingdom PMR Trunking Standards.

*Primary Examiner*—Thanh Cong Le
*Attorney, Agent, or Firm*—Pillsbury Madison & Sutro LLP

[57] ABSTRACT

A method and mobile radio system for establishing a group call extending to service areas of several exchanges in a mobile radio system which includes at least a first exchange and a second exchange, telecommunication media for establishing communication connections between at least the first exchange and the second exchange, and a plurality of mobile stations communicating via the exchanges. The method includes selecting a second exchange to which the group call is routed from the first exchange. To save telecommunication resources in a mobile radio system, checking, before routing the call to the second exchange, whether a telecommunication medium has been previously allocated on the connection from the first to the second exchange for the group call to be established, and, if so, routing the group call to be established from the first to the second exchange without allocating a new telecommunication medium to that connection.

4 Claims, 2 Drawing Sheets

ESTABLISHING A GROUP CALL IN A MOBILE RADIO SYSTEM

FIELD OF THE INVENTION

This application claims benefit of international application PCT/FI95/00614, filed Nov. 10, 1995.

The invention relates to a method for establishing a group call extending to service areas of a plurality of exchanges in a mobile radio system comprising at least a first and a second exchange, telecommunication media for establishing communication connections between at least the first and the second exchange, and mobile stations communicating via said exchanges; the method comprising the step of selecting a second exchange to which the group call is routed from the first exchange.

The invention relates to a mobile radio system in which group calls are to be established between subscribers that may be located in areas of a plurality of exchanges.

BACKGROUND OF THE INVENTION

The invention is intended for use especially in so-called trunking networks that are typically company networks or private mobile radio networks used by authorities, all the channels of such networks being used by one or more companies or authority organizations. In addition to subscriber numbers, the subscribers of these networks have group numbers indicating the group call group or subscriber group that the subscriber belongs to. This makes it possible to transmit calls addressed to the members of a certain group to the subscribers of the group.

The invention is suitable for use in mobile radio systems having either a digital or an analog radio paths. The digital mobile radio systems may comply, e.g., to the TETRA system (Trans European Trunked Radio System). Analog mobile radio systems are described, e.g. in MPT 1327, A Signalling Standard for Trunked Private Land Mobile Radio Systems, January 1988, revised and reprinted November 1991, and MPT 1343, Performance Specification, January 1988, revised and reprinted September 1991, both issued by the Radiocommunications Agency, published by the British Department of Trade and Industry.

One essential feature of, e.g., the above mentioned mobile radio systems is that they allow and are designed for the implementation of a group call between several subscribers.

A group call is a conference call during which all the participants are able to both speak and listen to one another, in turns. In group calls, the entire group is called by a single call number. An individual mobile station (e.g. radio phone), or a subscriber station, may belong to several groups programmed in the respective mobile station. The system contains a file storing information about base stations associated with the number of each group. A group call may cover one, more one of or all base stations located within the area of a mobile exchange, or a plurality of mobile exchanges. To establish a group call, each base station belonging to the group allocates a traffic channel and transmits a group call request containing a group number and information about the traffic channel allocated. If a mobile station identifies as being one of a group to which it belongs the group number contained in the group call request, it switches to the traffic channel indicated by the group call request. In principle, a mobile station is thus always able to enter a group call, if it is located within the predetermined operation area of the group and if the request to enter the call originates in that area.

A group call is usually a characteristic of networks designed for special purposes. Such networks do usually not comprise many exchanges. Conventionally, the area for setting up a group call has been limited, e.g., to the area of one exchange. The problem of establishing a group call in a network of several free-connected exchanges has thus arisen as mobile radio systems have become larger in size and as one has started to establish group calls extending to service areas of several exchanges.

The conventional way of establishing a group call to service areas of several exchanges is to try and route the group call as a whole and not branch it until as close to the destination exchanges as possible.

The known methods for establishing a group call do not offer a routing technique to a free-connected network comprising several exchanges, to the service areas of which a group call is to be established. The methods do not take into account situations where a call must be routed via several exchanges and branched at suitable points. In such cases, the major problem is to find optimal routes and minimize the use of connections and resources.

FIG. 1 shows a mobile radio system of the prior art, illustrating problems involved therein. The figure shows exchanges 10 to 16. To the exchanges are connected base stations, to which in turn are connected mobile stations via a radio path, e.g. an A-subscriber A-SUBSCRIBER, which sends a group call set-up request, and a B-subscriber B-SUBSCRIBER, which is invited to enter the call in addition to the A-subscriber. In the prior art, when a group call is established to service areas of several exchanges, a first exchange 10, which establishes the group call to the service areas of other exchanges 12, 14, 15, 16 by the command of the A-subscriber A-SUBSCRIBER, first establishes the call to the second exchange 12 and then to the third exchange 15. The first exchange then establishes the call to the fourth exchange 14 and the fifth exchange 16. In the prior art, the first exchange 10 establishing the call first establishes the call to the second exchange 12 and allocates necessary telecommunication resources 101, such as a telecommunication medium, between the respective exchanges. The first exchange 10 establishing the call then establishes the call to the third exchange 15, e.g. via the second exchange 12 and allocates communication connections for the call from the first exchange 10 to the third exchange 15 via the second exchange 12. One problem here is that telecommunication resources may be allocated twice between the first 10 and second exchange 12 for the group call to be established: first when a call is established, to mobile stations located in the service area of the second exchange 12, and second, to the mobile stations located in the service area of the third exchange 15, or to other exchanges 16. In FIG. 1, the thickness of the lines between exchanges 10, 12, 14, 15 and 16 describing telecommunication buses, resources and media indicates how many telecommunication media are allocated for one and the same group call on the connection concerned. Another problem with a solution like this is that it slows down call set-up, since at least double resources have to be allocated for a specified call, and so time is wasted on the allocation of 'surplus' resources. Yet another problem is that call set-up may even be hindered if no free telecommunication resource is available between the first 10 and second 12 exchange for a group call to be established to the third exchange 15.

In a star-like network, a group call is easy to establish and the above problem does not arise, since the nodal exchange establishing the group call routes the call to exchanges that are associated with subscribers belonging to the group. The nodal exchange can then allocate only one speech connection or other telecommunication resource or medium to each exchange requiring such a connection. A star-like network, however, is not suitable for all mobile radio systems, especially not for extensive modern systems.

SUMMARY OF THE INVENTION

One object of the invention is to route a group call in a sensible manner to several subscribers located in service areas of several exchanges such that optimal routes and minimal resources are used.

Another object of the invention is to solve the problems involved in the prior art. In particular, the invention aims at eliminating the problem caused by the fact that when a group call is established to service areas of several exchanges, double or multiple telecommunication resources, such as communication connections or other telecommunication media, may be unnecessarily allocated for one and the same group call between two exchanges.

Yet another object of the invention is to speed and secure group call set-up in a situation where a group call is established in service areas of several exchanges.

A further object is to simplify call set-up in a situation where a group call is to be established to subscribers located in service areas of several exchanges.

This new type of method for establishing a group call extending to service areas of several exchanges is achieved with the method of the invention, which is characterized by comprising the steps of checking, before the call is routed to the second exchange, whether a telecommunication medium has been previously allocated on the connection from the first to the second exchange for the group call to be established; routing the group call to be established from the first to the second exchange without allocating a new telecommunication medium to the connection if a telecommunication medium has been previously allocated on that connection for the group call to be established.

The invention also relates to a mobile radio system for establishing a group call extending to service areas of several exchanges, the mobile radio system comprising at least a first and a second exchange, telecommunication media for establishing communication connections between at least the first and the second exchange, and mobile stations communicating via the exchanges.

The mobile station system according to the invention is characterized by comprising check means for checking whether a telecommunication medium has been previously allocated on the connection between the first and the second exchange for the call to be established.

The basic idea of the invention is that before a call is routed from the first, call establishing, exchange to the second exchange, one checks whether a telecommunication medium has been previously allocated on the connection from the first to the second exchange for the group call to be established. The group call to be established is then routed from the first to the second exchange without allocating a new telecommunication medium to the connection if a telecommunication medium has been previously allocated on that connection for the group call to be established.

The invention is thus based on a check carried out in allocating resources to connections between exchanges to see whether resources have been previously allocated for the call on the connection concerned. The object of the invention is to make individual call branches, i.e. connections between exchanges, use common resources. This is implemented, e.g., such that the call set-up process records in the database the resources allocated for the call on each connection, thereby preventing allocation of multiple resources on one connection. When the call is forwarded from the exchange, it is possible to check from the database that no telecommunication medium has been previously allocated to the connection.

One advantage of such a method for establishing a group call extending to service areas of several exchanges in a mobile radio system, and of a mobile radio system is that they solve the problems involved in the prior art. A particular advantage of the invention is that it eliminates the problem of unnecessarily allocating double or multiple telecommunication resources, such as communication connections or other telecommunication media, for one and the same call between two exchanges when a group call is established to service areas of several exchanges.

Another advantage of the invention is that it also speeds and secures group call set-up when a group call is established to service areas of several exchanges.

Yet another advantage of the invention is that it simplifies call set-up in a situation where a group call is to be established to subscribers located on service areas of several exchanges.

A further advantage is that the solution provided by the invention does not place restrictions on the routing method used. When a call is routed to a single exchange, the invention makes it possible to use different methods that are considered the most suitable for the network and application concerned. This solution makes it possible to set up group calls in rather different networks operating in different manners. Different resource and load allocation functions can thereby be performed by the actual routing method, and the present solution provides an effective method for establishing group calls.

A still further advantage is that in the implementation of the invention, it is not very significant to the routing which exchange is selected to establish the call. The method functions rather well, independently of the exchange associated with the group call that is selected to start the call set-up.

A further advantage of the invention is that subscribers can enter an on-going group call. The solution of the invention makes it possible to engage a new subscriber in a group call without any exceptional call set-up procedures.

Another advantage of the invention is that it enables effective use of the resources of a mobile radio system without complicated and time-consuming deduction algorithms for selecting the route and suitable points of branching.

Yet another advantage of the invention is that it makes the use of computing capacity and connection resources of the mobile radio system, especially those of its exchanges, more effective in group call set-up.

BRIEF DESCRIPTION OF THE DRAWINGS

In the following, the invention will be described in greater detail with reference to the attached drawings, in which.

DETAILED DESCRIPTION OF A PREFERRED EMBODIMENT OF THE INVENTION

Figure 1:
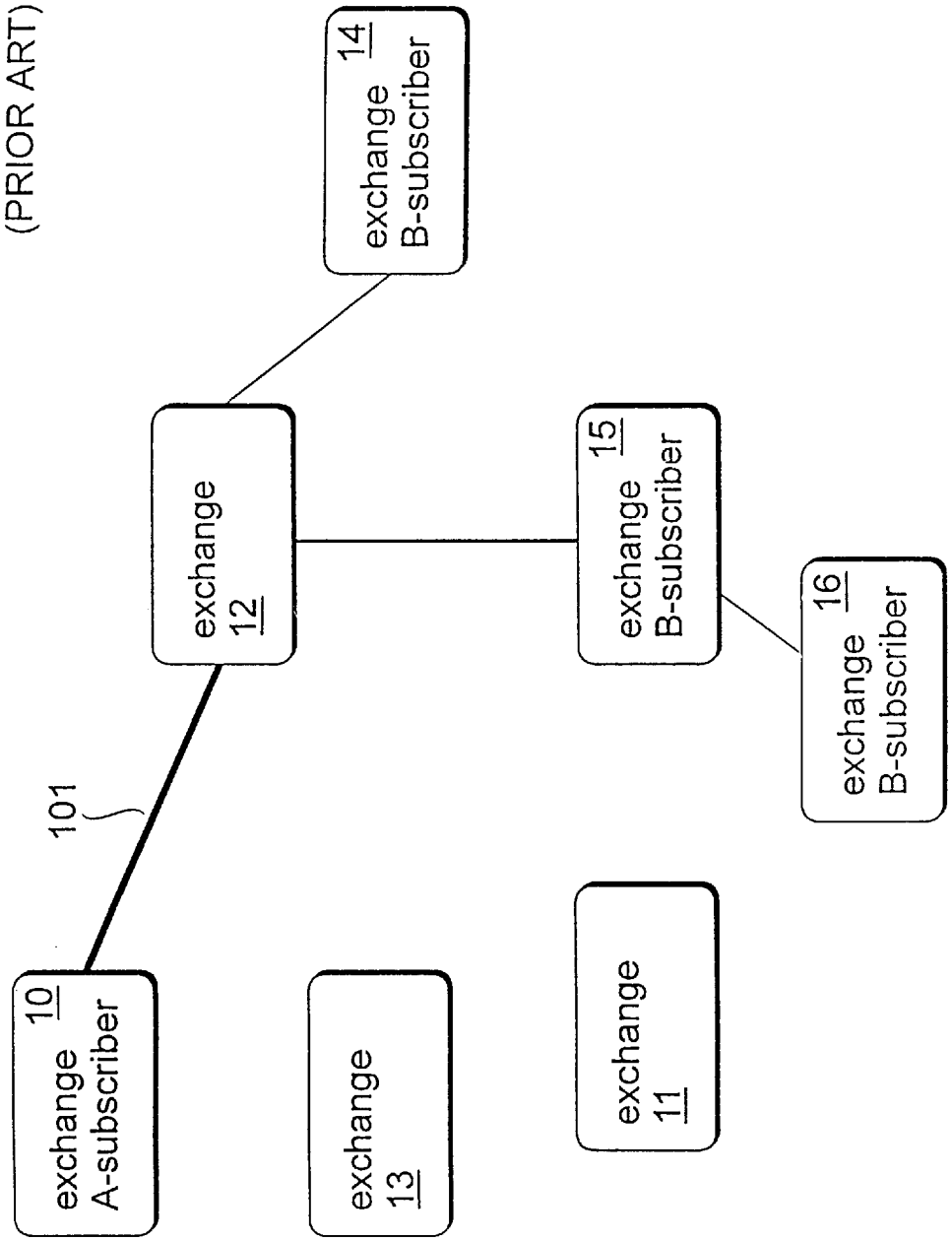
FIG. 1 is a block diagram of a mobile radio system according to the prior art, illustrating problems involved therein.

FIG. 1 is described above in connection with the description of the background art.

Figure 2:
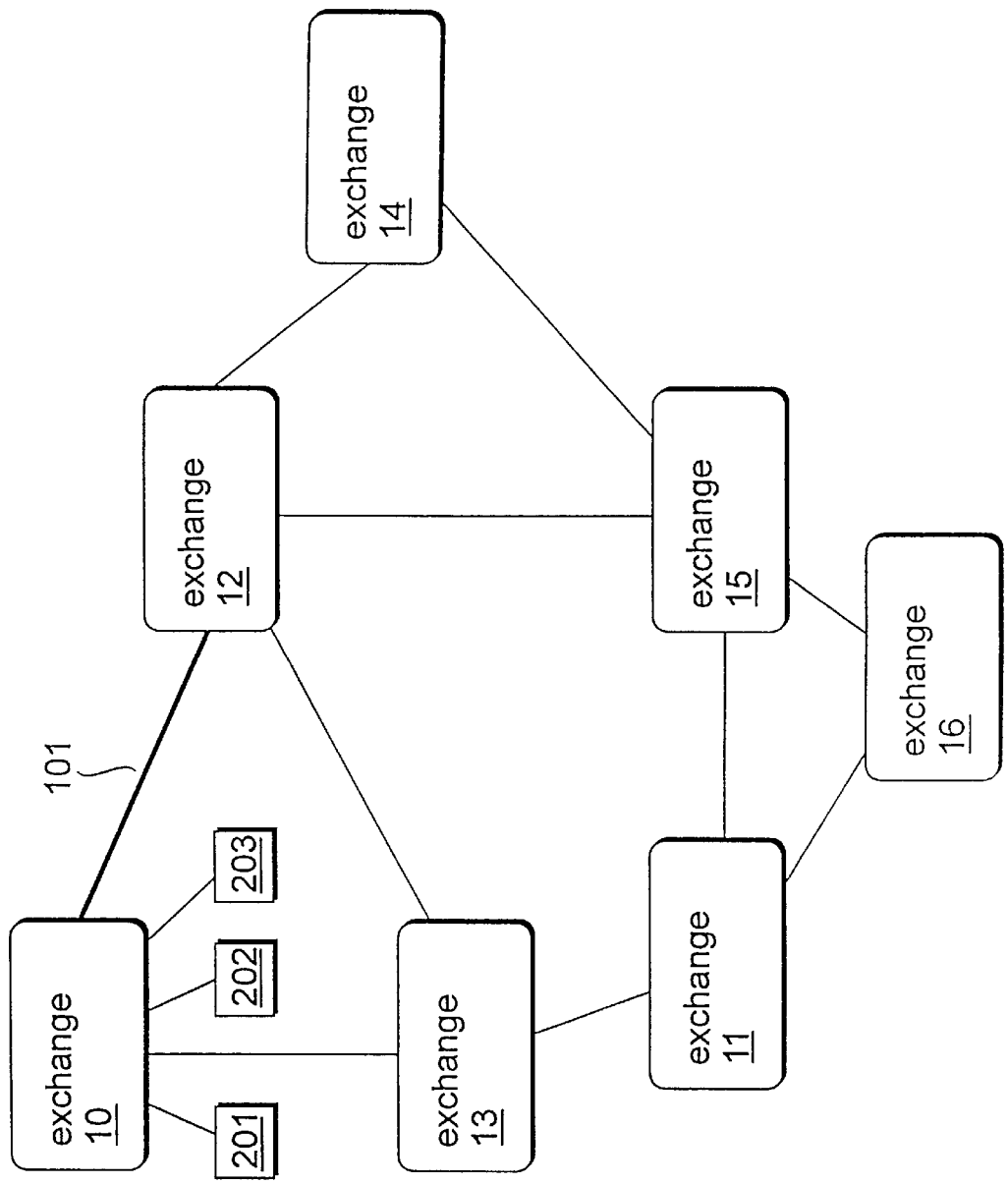
FIG. 2 is a block diagram of a mobile radio system according to the invention.

FIG. 2 is a block diagram of a mobile radio system according to the invention, the system comprising exchanges 10 to 16. In a network set up for practicing the invention, establishment of a group call is started by checking what exchanges are associated with the group call. Then, the exchange or exchanges for establishing the call must be selected. The simplest solution is to select one exchange that establishes a call to all other exchanges associated with the group call. The exchange may be, e.g., an exchange in which is stored information about the group concerned, or it may be an exchange selected at random.

The exchange establishing the call establishes the connections between the exchanges involved in the call separately to each exchange. When the exchange establishing the call or any exchange on the route selects a route forward, it checks, according to the invention, whether it can use the resources previously allocated for the group call on the route concerned. Such resources include a telecommunication medium or a telecommunication resource, such as a telecommunication bus, or a telecommunication channel, a telecommunication time slot, or, e.g., multiplexing, encoding or decoding means. If resources have been previously allocated on the connection concerned for the group call to be established, the exchange instructs the call to use the same resources.

FIG. 2 shows a simple example for a mobile radio network.

If a group call is to be established in the network of FIG. 2 including exchanges 10, 12, 13, 14, 15 and 16, exchange 10 can be selected for call establishment. The exchange then establishes connections 10--12, 10--13, 10--14, 10--15 and 10--16 between the exchanges separately. Individual branches can be assumed to be routed e.g. as follows:

branch A: 10--12: 10-12
branch B: 10--13: 10-13
branch C: 10--14: 10-12-14
branch D: 10--15: 10-12-15
branch E: 10--16: 10-12-15-16.

If the call branches are established in the above order, exchange 10 notices upon establishing branches C, D and E that a connection has been previously allocated for the call on connection 10--12, so no new resources need to be allocated. Upon establishing branch E, exchange 12 notices that a connection has been previously allocated and thus no new connection needs to be allocated. Thus, only one speech connection needs to be allocated for the entire call on connections 10--12, 10--13, 12--14, 12--15 and 15--16.

The optimal implementation depends on the routing method used, the group call type, and the structure of the network. In the most generally applicable and versatile solution, a group call is established by one exchange in the group call area, and joint use of resources is based on the use of an identity specific for each group call.

With regard to the load caused by the call set-up, it is preferable that only one exchange, which itself belongs to the group call area, establishes the call. Depending on the routing method, this is often the best routing solution.

The use of identities specific for each group call is advisable, since it makes it possible to guide subscribers entering an on-going call to use resources previously allocated for the call concerned.

In the invention, a group call is established as follows:

1. A group call is divided into call branches destined to different exchanges. All call branches are given the same unambiguous group call identity CALL ID specific for each call.

2. One exchange starts to route the different call branches separately to the destination exchanges.

3. The exchange performing the routing determines, on the basis of a desired routing algorithm, the exchange to which the call branch is to be routed next. Together with call set-up requests, information about the call identity CALL ID is transmitted.

4. When the next exchange of the route has been selected for a call branch, a request is transmitted to the system that allocates resources, e.g. to a software process, to allocate resources to said exchange.

5. The resource manager checks the database to find out whether resources have been previously allocated to said exchange by the same call identity CALL ID. If resources have been allocated, the call set-up unit of the exchange concerned is informed of the resources available to the call branch, and the call set-up process can proceed to the next exchange of the route. If no resources have been allocated before, they are allocated at this stage, and the call set-up unit is informed of the resources available to the branch, and the process continues as above.

6. The routing of a call branch is continued until the branch has reached the destination exchange.

In the following, the structure of the mobile radio system of the invention is described with reference to FIG. 2.

To establish a desired group call, the mobile radio system of the invention comprises check means 201 for checking whether a telecommunication medium has been previously allocated for the group call concerned on the connection from the first 10 to the second 12 exchange.

The mobile radio system of the invention further comprises a database 202 which indicates, specifically for each group call, the telecommunication media 101 that are allocated for the respective group call on each connection from the first 10 to the second 12 exchange.

In the mobile radio system of the invention, the check means 201 are arranged to allocate a telecommunication medium 101 on the connection (10--12) for the group call to be established, if said database 202 indicates that no telecommunication medium 101 has been previously allocated for the group call on the connection. Further, the check means 201 are arranged to route the group call to be established from the first to the second 12 exchange by the allocated telecommunication medium 101.

Further, in the mobile radio system of the invention the check means 201 are arranged to route the group call to be established from the first 10 to the second 12 exchange with the telecommunication medium 101 previously allocated for the group call concerned if the database 202 indicates that a telecommunication medium 101 has been previously allocated on the connection from the first 10 to the second 12 exchange for the group call to be established.

The mobile radio system of the invention further comprises means 203 for marking the allocation of the telecommunication medium 101 in the database 202, if the database 202 does not indicate that a telecommunication medium 101 has been previously allocated for the group call on the connection.

Thus, the basic idea of the invention is that several connections are established between different exchanges for the same group call in a mobile radio system such that only one telecommunication resource or medium, such as a telecommunication channel or time slot, is allocated between two exchanges for one and the same group call. The connections established between two exchanges for one and the same group call thus use the same telecommunication resource.

The exchange establishing the call can be selected and the resources for one and the same call combined quite freely. The exchange establishing the call may be the exchange of an A-subscriber or an exchange located in the service area of the group, or several exchanges may be involved in the call set-up. In the latter case, e.g. the exchanges of all B-subscribers (and C-subscriber) may establish a call to the exchange of the A-subscriber.

The resources used can be combined by many different methods. For example, each call or each group may have its own identity that can be used in the combination process. The method may also be more complicated: e.g. it is possible to send a message on a group call connection, whereby the exchange knows on the basis of the message how to establish the connections on which the message is transmitted.

The drawings and the description thereof are to be understood as illustrating the idea of the invention. The method and mobile radio system according to the invention may vary in their details within the scope of the claims. Although the invention is described above mainly with reference to radio phone systems, it can also be used in other kinds of mobile radio systems.

I claim:

1. A method for establishing a group call extending into the respective service areas of a plurality of exchanges in a mobile radio system which includes at least a first and a second exchange, a telecommunication transmission medium between said first and second exchanges, and a plurality of mobile stations communicating via said exchanges, said method comprising the steps of:

starting to establish a group call involving a plurality of said mobile stations, located within the respective service areas of a plurality of said exchanges, including said first and the second exchanges, selecting said second exchange to be one to which the group call is to be routed from said first exchange, maintaining a database which indicates, specifically for each group call, the telecommunication transmission medium that is allocated for that group call on each connection between respective ones of said exchanges, checking said database before routing said group call starting to be established from said first to said second exchange, to see whether a telecommunication transmission medium has been previously allocated on the respective said connection from said first to said second exchange for said group call starting to be established, routing said group call starting to be established from said first to said second exchange using a respective previously allocated telecommunication medium, without allocating a new telecommunication transmission medium to the respective said connection, if a telecommunication transmission medium has been previously allocated on the respective said connection for said group call starting to be established, as determined from said checking.

2. The method according to claim 1, further comprising the steps of:

if said database, when said checking is performed, does not indicate that a telecommunication transmission medium has been allocated for said group call starting to be established on the respective said connection, allocating a telecommunication transmission medium for said group call about to be established on the respective said connection between said first and second exchanges, marking allocation of the respective said telecommunication transmission medium in said database, and routing said group call starting to be established, from said first to said second exchange with the respective said telecommunication transmission medium allocated in said allocating step.

3. A mobile radio system for establishing a group call extending into the respective service areas of a plurality of exchanges, comprising:

a plurality of exchanges, including a first and a second exchange each having a respective source area, a plurality of mobile stations communicating via said exchanges, including via said first and second exchanges, a telecommunication transmission medium for establishing a group call between said first and second exchanges, a database which indicates, for each group call, the telecommunication transmission medium that is allocated for the respective said group call on each connection from said first to said second exchange, checking means for checking whether a telecommunication transmission medium has been previously allocated on the respective said connection from said first to said second exchange for said group call to be established, said checking means being arranged to:
  (a) allocate a telecommunication transmission medium on said connection between said first and said second exchange for said group call to be established, if said database indicates that no telecommunication transmission medium has been previously allocated for said group call on said connection between said first and said second exchange, and
  (b) route said group call to be established from the first to the second exchange respectively via said allocated or previously allocated telecommunication transmission medium.

4. A mobile radio system for establishing a group call extending into the respective service areas of a plurality of exchanges, comprising:

a plurality of exchanges, including a first and a second exchange each having a respective source area, a plurality of mobile stations communicating via said exchanges, including via said first and second exchanges, a telecommunication transmission medium for establishing a group call between said first and second exchanges, a database which indicates, for each group call, the telecommunication transmission medium that is allocated for the respective said group call on each connection from said first to said second exchange, checking means for checking whether a telecommunication transmission medium has been previously allocated on the respective said connection from said first to said second exchange for said group call to be established, means for marking allocation of the telecommunication transmission medium between said first and said second exchange in said database, if said database, upon checking of said check means does not indicate that the telecommunication transmission medium has been previously allocated for said group call on said connection between said first and second exchanges.

* * * * *

UNITED STATES PATENT AND TRADEMARK OFFICE
CERTIFICATE OF CORRECTION

PATENT NO. : 5,852,781
DATED : December 22, 1998
INVENTOR(S) : Jouko Ahvenainen

It is certified that error appears in the above-identified patent and that said Letters Patent is hereby corrected as shown below:

Claim 3, line 5, change "source" to -- service --

Claim 4, line 5, change "source" to --service--

Signed and Sealed this

Fifth Day of September, 2000

Attest:

Q. TODD DICKINSON

Attesting Officer

Director of Patents and Trademarks